Jan. 16, 1940.  D. McDONALD  2,187,209
DEHYDRATION
Filed April 17, 1937    2 Sheets-Sheet 1
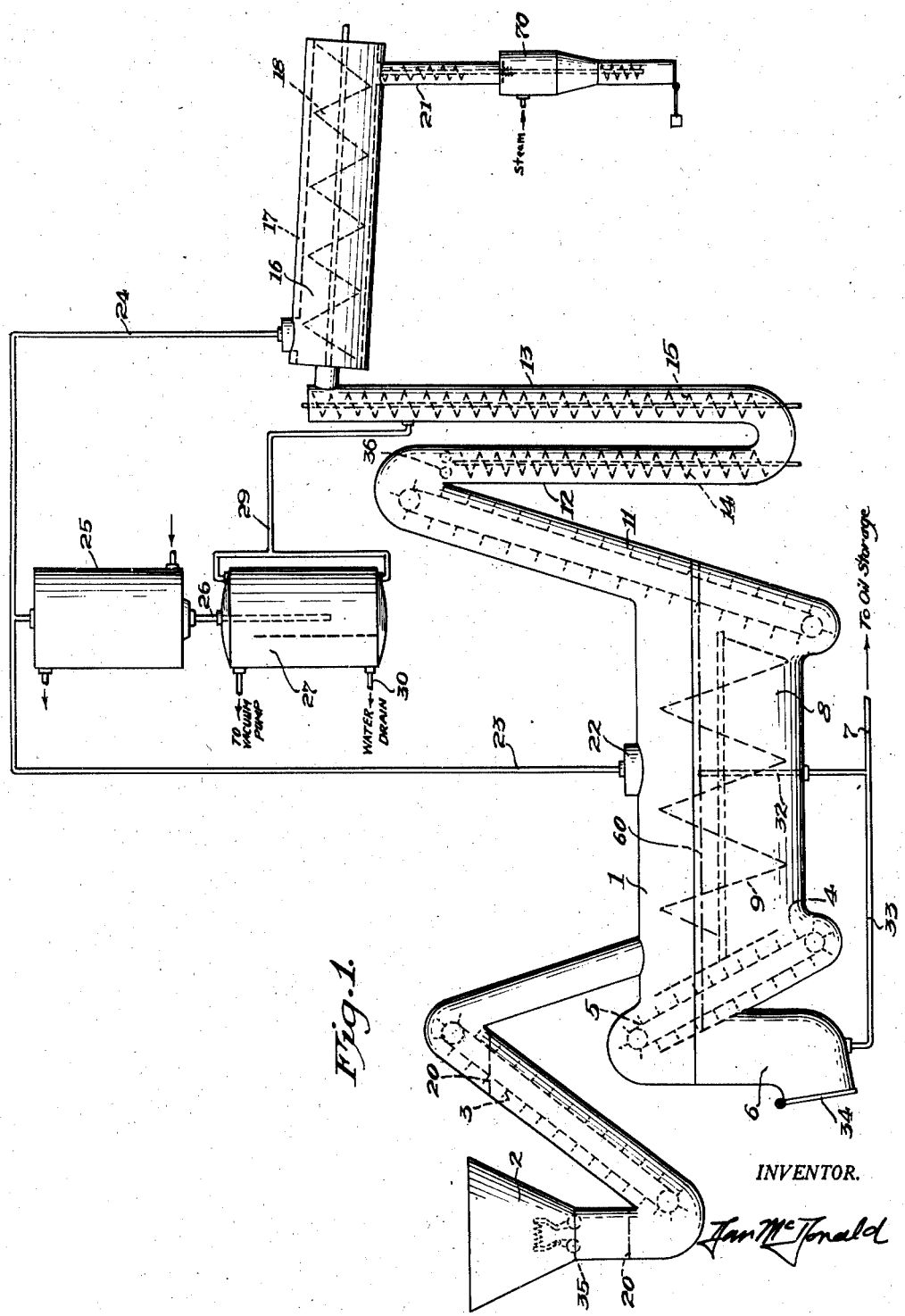
INVENTOR.
Dan McDonald

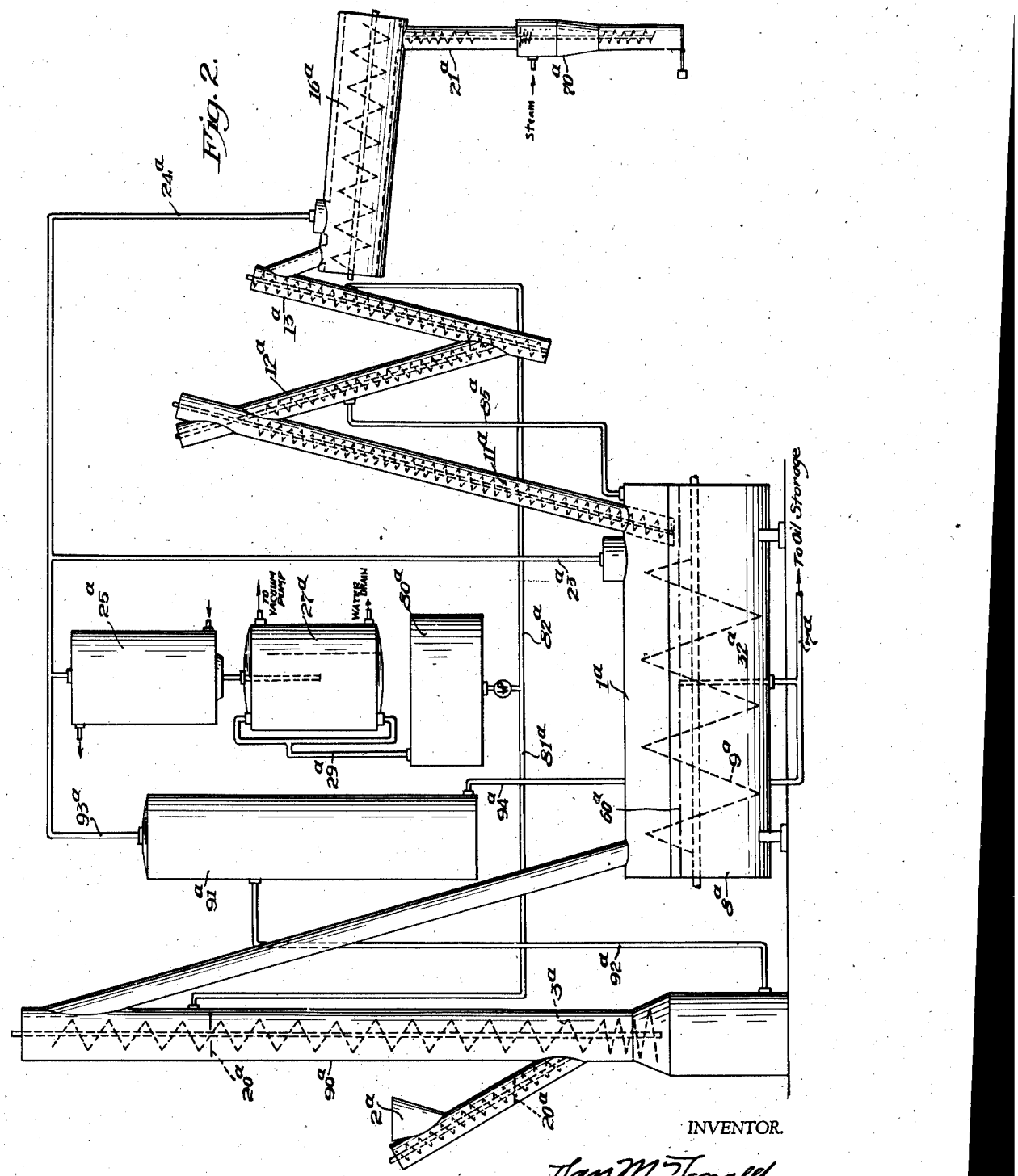

UNITED STATES PATENT OFFICE 2,187,209

DEHYDRATION

Dan McDonald, Los Angeles, Calif., assignor to Engineering Incorporated, Los Angeles, Calif., a corporation of California Application April 17, 1937, Serial No. 137,593

1 Claim. (Cl. 202—169)

This invention relates to apparatus for solvent-extracting oil from oleaginous material such as garbage, meat scraps, fish, meal and seeds of various kinds, vegetables, fruit, etc., and then freeing residual material of solvent and moisture; the apparatus being particularly applicable to the process described and claimed in my copending application Ser. No. 84,849, filed June 12, 1936.

It is an object of the invention to employ a dehydrating oil bath in connection with solvent extraction of oil, solvent being employed for first extracting oil from material, with residual material then dehydrated in the oil bath and the dehydrated material then preferably treated with solvent for extracting any oil which may have been carried over with the material from the oil bath.

It is a still further object of the invention to distill oil-bearing solvent in the dehydrating oil bath for vaporizing both solvent and aqueous moisture and for replenishing the oil bath by the oil of this distillation process.

It is a still further object of the invention to preferably employ a solvent having a lower latent heat and higher vapor pressure than aqueous moisture, and to preferably maintain the system under partial vacuum and heat the oil bath to a temperature well above the vapor point of the aqueous moisture, whereby efficient heat transfer is provided for rapidly and efficiently vaporizing solvent and aqueous moisture, and whereby economical and efficient recovery of solvent is assured.

It is a still further object of the invention to provide a continuous process, with the material passing continuously through a solvent-extraction column, with residual material then passing continuously through an oil bath for dehydration and thence being preferably passed through a receptacle containing a solvent which extracts oil carried over with the dehydrated material, and preferably finally passing continuously through a dryer wherein the last traces of solvent are evaporated and from whence the residual material is continuously discharged.

It is a still further object of the invention to provide a continuous process, operating under a partial vacuum which is sealed at the intake and at the discharge at which the material is continuously supplied to and withdrawn from the system.

It is a still further object of the invention to provide a continuous system wherein the solvent which has extracted oil carried over with the material which has been dehydrated in the oil bath, is continuously supplied to the extraction chamber and is continuously withdrawn therefrom and discharged into the oil bath for distillation therein, with the aqueous and solvent vapors from the oil bath and the solvent vapors from the dryer continuously withdrawn.

Further objects of the invention will be readily understood from the following description of the accompanying drawings, in which:

Fig. 1 is an apparatus for dehydrating material such as garbage, with both the original oil content and the oil of the dehydrating process then extracted from the dehydrated material by a suitable solvent.

Fig. 2 is an apparatus for solvent extraction of oil from material such as orange peel, with the residual peel then dehydrated and the oil of the dehydrating process then extracted by a suitable solvent.

Referring to Fig. 1, the material is first dehydrated in an oil bath, and then the oil which has been used in the dehydrating process, together with any original oil content in the material, is extracted by a suitable solvent. Such process is particularly applicable to dehydration of garbage, fish, animal scraps, etc.

On the other hand, when the material contains a valuable oil, the recovery of which is of primary importance, e. g. extraction of oil from orange peel, etc., the apparatus shown at Fig. 2 may be employed, the material being first subjected to a suitable extraction process, such as a solvent extraction process, and the material from which the valuable oil has been thus extracted and which residual material it may be desired to thoroughly dry, being then dehydrated in an oil bath, with subsequent solvent extraction of the oil which has been used in the dehydrating process.

The oil for the dehydrating process may be furnished by the material being dehydrated, e. g. garbage or animal scraps; or material which contains no oil, e. g. vegetables or fruits, or material from which the oil has been previously extracted, e. g. orange peel, may be dehydrated, with the oil for the dehyrating oil bath supplied from any extraneous source, e. g. a suitable mineral oil or a portion of the oil which has been extracted from the material prior to dehydration.

The apparatus shown at Fig. 1, which does not provide for solvent extraction of oil prior to dehydration and which is particularly applicable for dehydrating garbage, etc., includes a dehydrating chamber 1, which is preferably continuously supplied with garbage from a hopper 2 via a conveyor 3, with heavy inorganic matter which may be present with the garbage, e. g. glass, metal, etc., removed by gravity at the outlet 4 and carried by a conveyor 5 to a receiver 6. An oil bath 60 is maintained in the chamber 1, with excess oil overflowing into a stand pipe 32, and with the oil bath maintained at the desired temperature by a steam jacket 8 which surrounds the lower part of the chamber 1 to the level of the oil bath.

The garbage is continuously moved along the chamber 1 by a spiral conveyor 9 which also disintegrates the garbage to insure gravity discharge of extraneous material at the outlet 4; and a conveyor 11 continuously elevates the dehydrated garbage at the exit end of the chamber 1 and dumps it into an oil extractor which is preferably a U-tube 12—13 containing a suitable solvent. The U-tube has spiral conveyors 14—15 in its respective legs, the conveyor 14 moving the dehydrated garbage down the leg 12 of the extractor and the conveyor 15 then elevating the garbage through the leg 13 of the extractor. The dehydrated garbage from which the solvent has extracted the oil, is discharged from the leg 13 of the extractor into a suitable dryer 16, the material being preferably agitated and moved continuously along the dryer by a spiral conveyor 18, and a steam jacket 17 maintaining the desired temperature for evaporating and removing all remaining traces of the solvent.

The system is preferably a closed system under partial vacuum, with the supply hopper 2 preferably sealed by a body of oil which is shown at 20, and through which the material which is to be treated may be continuously supplied to the system, and with the dehydrated garbage which passes through the dryer continuously discharging via conduit 21 which has a seal 70, preferably of the type disclosed in my copending application Ser. No. 137,884, filed April 19, 1937, and whereby a compact mass of the dried material is maintained in the seal above its discharge gate, with this mass of material sealing the conduit 21 to the atmosphere while material is discharging via the gate.

The partial vacuum in the system withdraws vapors from the chamber 1 at a dome 22 which communicates with a conduit 23, and the partial vacuum in the system also withdraws vapors from the dryer 16 via a conduit 24. The vapors from the conduits 23—24 are passed through a condenser 25 from whence the condensate is drawn into a water separator 27 via a conduit 26. Water is drained off at 30, and a conduit 31 leads from the upper portion of the water separator to a suitable vacuum pump (not shown) whereby the system is maintained under partial vacuum. The solvent which collects in the water separator is supplied via pipe 29 to the upper end of the leg 13 of the oil extractor and overflows from the leg 12 of the oil extractor into the dehydrating chamber 1, thereby flowing through the U-tube 12—13 counter to the movement of the material which is being processed.

The garbage when first supplied to the hopper 2 may be passed between rollers 35 which are preferably urged toward one another by suitable springs so that they may yield to permit passage of extraneous material such as glass or metal which the rollers cannot crush, and such extraneous material, which is subsequently collected in the receiver 6, may be periodically removed therefrom through a normally closed outlet 34.

Any grease or oil settling from the material which is collected in the receiver 6 may be drained off via a conduit 33. This conduit, and the stand pipe 32 through which excess oil is removed from the chamber 1, may be connected to a conduit 7 through which the oil is conveyed to a suitable storage tank (not shown).

After its dehydration in the chamber 1, the garbage is preferably ground before the solvent in the U-tube 12—13 extracts oil from the garbage, and for this purpose grinding rollers 36 may be provided at the upper end of the leg 12 of the solvent extractor.

The garbage to be dehydrated is supplied at the hopper 2, with the liquid for the seal 20 preferably supplied by the grease which settles from the garbage, to which additional oil may be added if necessary in order to create the desired seal when first starting the dehydrating process; and the conveyor 3 is of a height whereby the vacuum in the system elevates the sealing liquid in this conveyor to a level short of overflow into the dehydrating chamber 1. The oil bath 60 is maintained by the grease which is a part of the garbage, being replenished during the process as hereinafter described; but at the start of the process grease may be supplied to the chamber 1 from any suitable source in order to initially raise the oil bath to the desired level.

The oil bath is heated by the steam jacket 8 so as to vaporize the moisture of the garbage which is supplied to the chamber 1, and the garbage, when withdrawn via the conveyor 11, is thus in a dehydrated condition but may contain some quantity of the oil which has formed the oil bath, together with the grease and oil content of the garbage which has not settled out in the oil bath. This oil and grease is extracted from the dehydrated garbage, preferably by a suitable solvent, such as the chlorinated hydrocarbon solvents, and preferably one of the chlorinated hydrocarbon solvents which has a lower latent heat and higher vapor pressure than water, trichlorethylene for example. The solvent is supplied via the conduit 29 to the U-tube 12—13, and flows through the U-tube counter to the direction of movement of the garbage which is being processed, so as to extract oil and grease from the dehydrated garbage. The garbage is then passed through the dryer 16 where any remaining traces of solvent are readily evaporated under the partial vacuum which is maintained in the system, comparatively little heat being required for evaporating the remaining traces of solvent due to the relatively low latent heat of solvents such as trichlorethylene. The dehydrated garbage, free of solvent, is then continuously withdrawn past the seal 70.

The solvent in the U-tube 12—13 which has dissolved the oils, fats and greases of the garbage, is distilled for separate recovery of the solvent and the oil, and this distillation is preferably carried on in the dehydrating chamber 1, utilizing the heat of the oil bath 60. For this purpose the solvent overflows into the conveyor 11 and thence into the chamber 1, where the heat of the oil bath vaporizes the aqueous moisture of the garbage as previously described, and at the same time distils the oil-bearing solvent. The mixed solvent and aqueous vapors are withdrawn at the dome 22, and the oil of the distillation process replenishes the supply of oil which constitutes the oil bath 60.

With the system under partial vacuum, e. g.

in the neighborhood of 26" Hg., the oil bath is preferably maintained at a temperature well above the vapor point of the moisture of the garbage, e. g. approximately 200 degrees F., and the material is maintained in the oil bath until substantially all of the aqueous moisture has been evaporated. The oil bath thus provides an efficient heat transfer for rapidly evaporating aqueous moisture and distilling the oil-bearing solvent, with substantially complete recovery of solvent assured due to the solvent having a higher vapor pressure than water whether the quantity of solvent will be appreciably the greater of the two components in the vapor phase, and substantially all of the solvent will thus have been vaporized before the process is carried to completion for evaporating substantially all of the aqueous moisture.

The vapors of the dehydration and distillation processes are drawn into the condenser 25 by the partial vacuum in the system, and the solvent condensate is separated and then returned to the U-tube 12—13 for reuse in extracting oil from the dehydrated garbage.

The apparatus shown at Fig. 2, which provides for solvent extraction of oil from material prior to its dehydration, and which is particularly applicable to processing orange peel, etc., which contains valuable oil, includes a dehydrating chamber 1ª, which is preferably continuously supplied with material from a hopper 2ª via a charging tank 90ª. An oil bath 60ª is maintained in the chamber 1ª, with excess oil overflowing into a stand pipe 32ª, and with the oil bath maintained at the desired temperature by a steam jacket 8ª which surrounds the lower part of the chamber 1ª to the level of the oil bath.

The material is continuously moved along the chamber 1ª by a spiral conveyor 9ª, and a conveyor 11ª continuously elevates the dehydrated material at the exit end of the chamber 1ª and dumps it into an oil extractor 12ª—13ª which contains a suitable solvent and which is similar to the extractor 12—13 of Fig. 1. The dehydrated material, from which the solvent in the tubes 12ª—13ª has extracted oil, is discharged into a dryer 16ª which is similar to that shown at Fig. 1, and through which the material is continuously moved.

The system is preferably a closed system under partial vacuum, with the supply hopper 2ª preferably sealed by a body of solvent 20ª which is contained in the charging tank 90ª, and through which the material may be continuously supplied to the dehydrator 1ª, and with the dehydrated material which passes through the dryer 16ª continuously discharging via a conduit 21ª which is provided with a seal 70ª such as previously described.

As described in connection with Fig. 1, the partial vacuum in the system withdraws vapors via conduits 23ª—24ª, with the vapors condensed at 25ª and the solvent condensate separated at 27ª and drawn off via conduit 29ª. The solvent condensate is preferably collected in a storage tank 80ª, from whence it is pumped via branch conduits 81ª—82ª, to the upper portion of the charging tank 90ª and to the upper end of the leg 13ª of the oil extractor.

The solvent which is supplied to the leg 13ª of the oil extractor overflows from the leg 12ª of the extractor, preferably into a conduit 85ª which leads to the dehydrating chamber 1ª, thereby flowing through the oil extractor counter to movement of the material which is being processed.

The solvent which is supplied via conduit 81ª to the charging tank 90ª, furnishes the body of solvent 20ª through which the incoming material passes and which extracts oil from the material; and the material then rises through the charging tank, preferably by specific gravity differential, aided by a spiral conveyor 3ª, with the solvent which is supplied via conduit 81ª flowing counter to the material so as to dissolve the last traces of oil and rinse or displace the oil bearing solvent. The material from which oil has been extracted by the solvent, then discharges into the dehydrating chamber 1ª.

The oil bearing solvent which collects in the bottom of the charging tank 90ª, is preferably withdrawn to a still 91ª via a conduit 92ª, with the solvent vapors of the distillation process withdrawn via a conduit 93ª which leads to the condenser 25ª, so that the partial vacuum in the system is maintained in the still, and its solvent vapors are withdrawn, condensed and returned to storage tank 80ª. The oil from the still is withdrawn via a conduit 94ª. This conduit, and the stand pipe 32ª through which any excess oil is removed from the chamber 1ª, may be connected to a conduit 7ª through which the oil is withdrawn to storage.

The material from which oil is to be extracted and which is to then be dehydrated, is supplied at the hopper 2ª, with oil then extracted by the solvent 20ª which also forms a liquid seal. The material from which the oil has been extracted is then discharged into the dehydrating chamber 1ª, in which the oil bath 60ª is maintained by oil supplied from any suitable source. The material which has been dehydrated in the chamber 1ª and which may contain some quantity of the oil which has formed the bath, is then passed through the extractor 12ª—13ª for extracting this oil, with the material then passing through the dryer 16ª for discharge past the seal 70ª.

The oil-bearing solvent from the extractor 12ª—13ª, which is returned to the dehydrating chamber 1ª via the conduit 85ª, and any solvent from the charging tank 90ª which may have been carried over with the material into the dehydrating chamber 1ª, is thus distilled in the dehydrating chamber along with evaporation of aqueous moisture; and the solvent which is supplied to the charging tank 90ª and to the extractor 12ª—13ª, is preferably of lower latent heat and higher vapor pressure than water, e. g. trichlorethylene, so that the distillation and dehydration in the chamber 1ª, will result in complete recovery of solvent as previously explained. The solvent and aqueous vapors are withdrawn from the chamber 1ª, and are then condensed and separated as previously described in connection with Fig. 1.

The invention thus provides for rapid dehydration of material which has been first subjected to an oil extraction process. The material is dehydrated in an oil bath and then subjected to a solvent extraction process whereby oil carried over with the material from the dehydrating bath, together with any original oil content remaining with the material, is then extracted from the dehydrated material. The solvent is then distilled, preferably in the oil bath, with all traces of solvent preferably removed from the residual material by evaporation, and with evaporation of moisture and of solvent, and distillation of solvent, preferably under vacuum.

I claim:

In extraction apparatus, means for extracting oil from material by means of a solvent, a heated oil bath for residual material, a solvent extraction chamber, means for withdrawing material from the oil bath and supplying the same to the solvent extraction chamber, means for discharging oil-bearing solvent from the solvent extraction chamber to the oil bath, and means for withdrawing vapors from the oil bath.

DAN McDONALD.